UNITED STATES PATENT OFFICE.

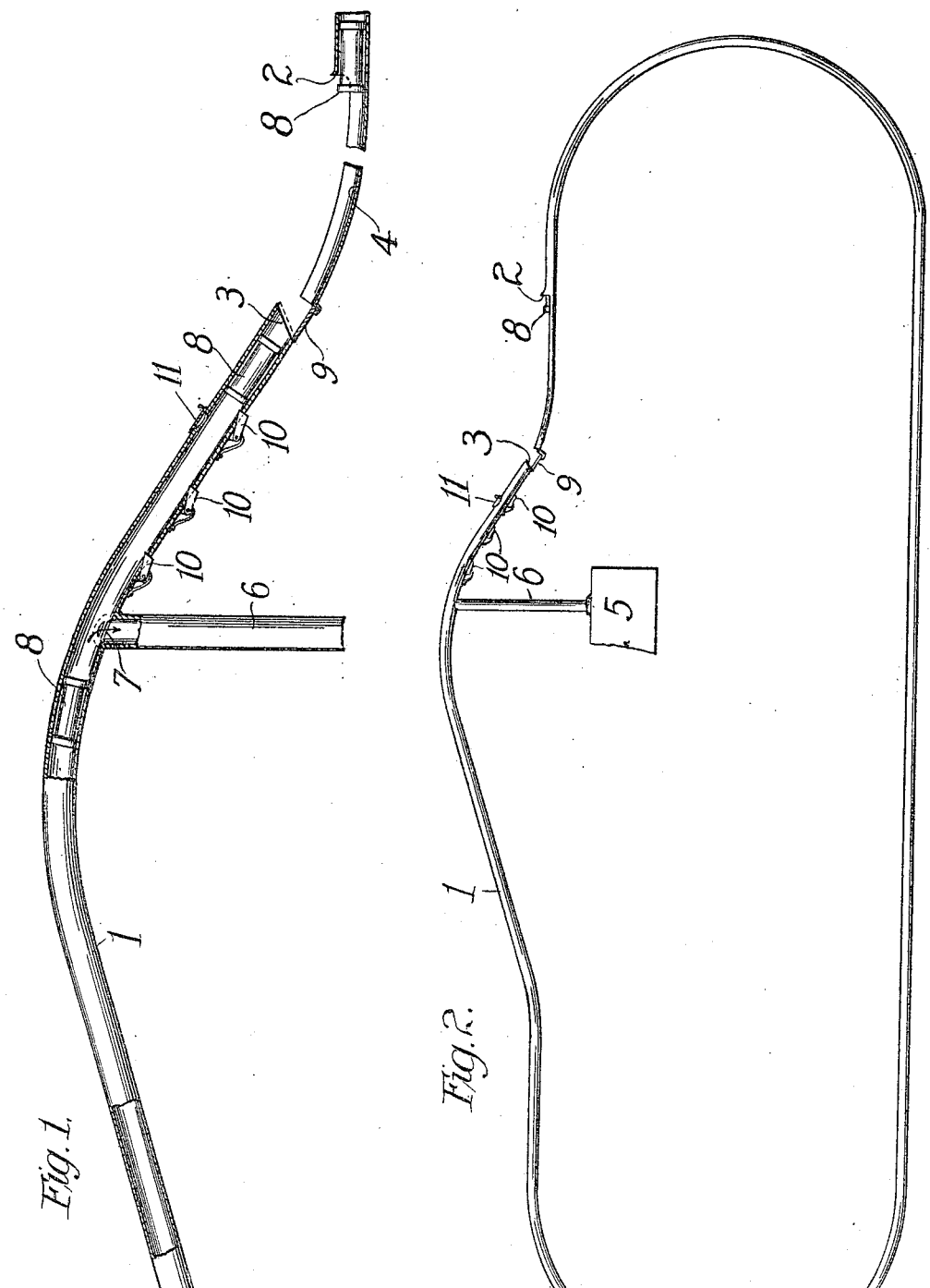

JOSEPH J. STOETZEL, OF CHICAGO, ILLINOIS, ASSIGNOR OF ONE-HALF TO HENRY J. COHN, OF CHICAGO, ILLINOIS.

PNEUMATIC TRANSMISSION SYSTEM.

959,642. Specification of Letters Patent. Patented May 31, 1910.

Application filed February 24, 1908. Serial No. 417,514.

*To all whom it may concern:*

Be it known that I, JOSEPH J. STOETZEL, a citizen of the United States of America, and a resident of Chicago, county of Cook, State of Illinois, have invented certain new and useful Improvements in Pneumatic Transmission Systems, of which the following is a specification.

The main objects of this invention are to provide an improved, simple and inexpensive form of pneumatic despatch apparatus; to provide a form of pneumatic despatch apparatus in which the presence of one carrier in the line serves to render effective the conveying air current therein for transmitting succeeding carriers; to provide a system of this character in which each carrier forms a closure for the delivery end of the despatch tube until it is discharged from the tube through the arrival of a succeeding carrier at the delivery end of the tube; to provide a form of pneumatic despatch apparatus which is particularly adapted for use as an amusement device, wherein cars containing passengers may be transmitted through the system and wherein the possibility of collision between cars is eliminated. These objects are accomplished by the device shown in the accompanying drawings, in which—

Figure 1 is a detail, partly in section, of a part of a pneumatic despatch apparatus constructed according to this invention. Fig. 2 is a diagrammatic representation of the complete system, the pumping mechanism being represented by a part of the suction drum.

In the construction shown in the drawings, the system is arranged for use as an amusement apparatus, the despatch tube being in the form of a loop with its discharge end in alinement with its receiving end and with a starting platform connecting said ends.

In the drawings, the despatch tube is designated 1, the bell mouth or despatch inlet is designated 2, and the discharge outlet is designated 3. In the form shown, the despatch tube is of circular transverse section, and the loading or starting platform 4 is in the form of a trough-shaped guiding surface extending in alinement between the two ends of the system, the whole forming an endless path for carriers. The system shown is of the vacuum type, in which the conveying air currents are produced by exhausting air from the tube near one end, and permitting the inflow of air from the atmosphere at the other end. The suction apparatus may be of any usual form and is indicated in the drawing by the suction drum 5 connected to the transit tube by the suction branch 6. The outlet 7, through which the air passes from the transit tube 1 to the suction branch 6, is located a considerable distance inward from the outlet end 3 of the tube, so that the air pressure in advance of the carriers will bring them to rest in the part of the tube which extends between the suction branch and the discharge outlet. The carriers are designated 8 in the drawings, and are shown, for the purpose of illustration, in the usual form.

The transit tube is provided with a gate 9 which may be lifted to serve as a closure for the delivery end when the operation of the system is started, as will hereinafter appear. In order to prevent carriers which have passed the suction branch from being drawn back toward said suction branch after having been brought to rest near the delivery outlet 3, a series of dogs 10 are provided, which are urged by springs into the path of carriers, but which yield to permit the passage of a carrier in the normal direction. The transit tube is provided with an air inlet located at a point rearward of the position at which the carriers come to rest. This air inlet is provided with a closure 11, which is closed during the normal operation of the system, but which may be opened to break the vacuum for permitting the last carrier in the system to pass out.

In the form shown, the despatch tube has an ascending inclination as it approaches the suction outlet, and has a descending inclination between said outlet and the delivery end of the tube. The grade of the descent is sufficiently steep to permit the carriers to pass out of the system by gravity when the pressure behind is equal to that of the atmosphere in front. The downwardly inclined part of the tube is of sufficient length so that the atmospheric pressure in advance of the carrier will bring the carrier to rest before it passes out of the delivery outlet 3.

The operation of the device shown is as follows:—When the device is used as an amusement apparatus and arranged as shown in the drawings, the passengers enter the carriers or cars 8 while said cars are on the receiving platform 4. The suction apparatus is assumed to be in continuous operation during the periods while the system is in use. To start the first car, the gate 9 at the outlet 3 is closed to prevent air from entering the outlet 3. The car is then pushed into the inlet 2, and the air pressure behind it forces it along the despatch tube until it has passed the mouth of the suction branch 6, when, being no longer under the influence of the conveying air current, its passage will be resisted by the pressure of air in advance of it, and it will be brought to rest before passing out of the outlet 3. The dogs 10 prevent a return movement of the car. The first car compresses the air between it and the gate 9, and as soon as the pressure of said air has equaled that of the outer atmosphere, the gate 9 will fall to its open position. As the air is exhausted in the rear of the car, it would tend to move in a reverse direction if it were not prevented by one of the dogs 10. A second car is now inserted into the inlet opening 2, and after it has passed the mouth of the suction branch, the air between it and the first car is compressed, and as soon as the pressure thereof is sufficiently great, the first car will pass out of the outlet 3, while the second car will come to rest inward of said outlet. After starting, there will always be one car in the system which serves as a closure for preventing air from entering the outlet 3 and breaking the vacuum in the system, and each car will be forced out of the system by the arrival of the succeeding car. By using only two cars, all possibility of collision between cars is prevented, since neither car can pass out upon the starting platform until the other car has passed the mouth of the suction branch.

When the invention is applied to a transmission system for commercial purposes, the discharge and delivery terminals would be at different stations, and carriers may therefore be despatched one after the other without limit as to number or distance between successive carriers. To cause the delivery of the last carrier from the system, the door 11 is opened so as to break the vacuum behind the carrier; or the stopping of the suction apparatus would, of course, result in the pressure of the system rising to atmospheric pressure, whereupon gravity would cause such last carrier to be delivered.

What I claim as my invention and desire to secure by Letters Patent is:—

1. A pneumatic despatch apparatus, comprising a transit tube normally open at its delivery end, a suction branch communicating therewith at a point a considerable distance inward from said delivery end, means located between said delivery end and said suction branch to prevent a carrier from moving in a reverse direction after having passed said suction branch, the length of the tube between said suction branch and said delivery end being such that a carrier after passing said suction branch will be brought to rest before passing out of said delivery end and thereby serve as a closure to prevent the inrush of air at said delivery end.

2. A pneumatic despatch apparatus, comprising a transit tube normally open at its delivery end, a suction branch communicating therewith at a point a considerable distance inward from said delivery end, means located between said delivery end and said suction branch to prevent a carrier from moving in a reverse direction after having passed said suction branch, the length of the tube between said suction branch and said delivery end being such that a carrier after passing said suction branch will be brought to rest before passing out of said delivery end and thereby serve as a closure to prevent the inrush of air at said delivery end, each carrier being adapted to be ejected from the tube through the pressure of air in advance of the succeeding carrier after said succeeding carrier has passed said suction branch.

3. A pneumatic despatch apparatus, comprising a transit tube normally open at its delivery end, a suction branch communicating therewith at a point a considerable distance inward from said delivery end, means located between said delivery end and said suction branch to prevent a carrier from moving in a reverse direction after having passed said suction branch, the length of the tube between said suction branch and said delivery end being such that a carrier after passing said suction branch will be brought to rest before passing out of said delivery end and thereby serve as a closure to prevent the inrush of air at said delivery end, the tube extending downwardly at said delivery end to permit a carrier to be discharged by gravity when the pressure behind it rises so as to counteract that of the outer air.

4. A pneumattic despatch apparatus, comprising a transit tube normally open at its delivery end, a suction branch communicating therewith at a point a considerable distance inward from said delivery end, means located between said delivery end and said suction branch to prevent a carrier from moving in a reverse direction after having passed said suction branch, the length of the tube between said suction branch and said delivery end being such that a carrier after passing said suction branch will be brought to rest before passing out of said delivery end and thereby serve as a closure to prevent the inrush of air at said delivery end, the tube extending downwardly at said delivery end to permit a carrier to be discharged by gravity when the pressure behind it rises so as to counteract that of the outer air, and an auxiliary air inlet between said delivery end and suction branch for admitting air behind a carrier when it is in said downwardly extending part of the transit tube.

5. A pneumatic despatch apparatus, comprising a transit tube normally open at its delivery end, a suction branch communicating therewith at a point a considerable distance inward from said delivery end, a spring pressed dog normally urged into the path of carriers between said delivery end and said suction branch to prevent a carrier from moving in a reverse direction after having passed said suction branch, the length of the tube between said suction branch and said delivery end being such that a carrier after passing said suction branch will be brought to rest before passing out of said delivery end and thereby serve as a closure to prevent the inrush of air at said delivery end.

6. A pneumatic despatch apparatus, comprising a transit tube normally open at its delivery end, a suction branch communicating therewith at a point a considerable distance inward from said delivery end, means located between said delivery end and said suction branch to prevent a carrier from moving in a reverse direction after having passed said suction branch, the length of the tube between said suction branch and said delivery end being such that a carrier after passing said suction branch will be brought to rest before passing out of said delivery end and thereby serve as a closure to prevent the inrush of air at said delivery end, and an auxiliary closure for said delivery end adapted to be closed for permitting the transmission of a carrier, when no carrier is in the tube near said delivery end.

7. A pneumatic transmission apparatus, comprising a looped transit tube having despatch and delivery terminals in alinement with each other, a guiding surface connecting said terminals to form an endless path for a carrier, a suction branch communicating with said transit tube a considerable distance inward from its delivery terminal, said tube between said suction branch and delivery terminal being arranged to prevent a carrier from passing out of said delivery terminal until a succeeding carrier has passed said suction branch.

8. A pneumatic transmission apparatus, comprising a transit tube having despatch and delivery terminals, a suction branch communicating with said transit tube a considerable distance inward from its delivery terminal, said tube between said suction branch and delivery terminal being arranged to prevent a carrier from passing out of said delivery terminal until a succeeding carrier has passed said suction branch.

Signed at Chicago this 20th day of February, 1908.

JOSEPH J. STOETZEL.

Witnesses:
WM. R. RUMMLER,
MARY M. DILLMAN.